(12) United States Patent
Okamoto et al.

(10) Patent No.: US 8,632,912 B2
(45) Date of Patent: Jan. 21, 2014

(54) BATTERY INCLUDING BAFFLING MEMBER AND SEALING MATERIAL THAT SEALS AUXILIARY TERMINAL TO LID PLATE

(75) Inventors: Katsuhiko Okamoto, Kyoto (JP); Masakazu Tsutsumi, Kyoto (JP); Shinsuke Yoshitake, Kyoto (JP); Takeshi Sasaki, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 22 days.

(21) Appl. No.: 13/087,146

(22) Filed: Apr. 14, 2011

(65) Prior Publication Data

US 2012/0264008 A1 Oct. 18, 2012

(51) Int. Cl.
*H01M 2/08* (2006.01)

(52) U.S. Cl.
USPC .......................................................... 429/182

(58) Field of Classification Search
None
See application file for complete search history.

(56) References Cited

U.S. PATENT DOCUMENTS

| | | | |
|---|---|---|---|
| 3,548,264 A | 12/1970 | Carino et al. | |
| 3,680,203 A | 8/1972 | Braiman et al. | |
| 3,686,538 A | 8/1972 | Webster | |
| 4,045,862 A | 9/1977 | Evans | |
| 4,074,417 A | 2/1978 | Pearce et al. | |
| 5,849,431 A * | 12/1998 | Kita et al. | 429/164 |
| 6,190,798 B1 | 2/2001 | Okada et al. | |
| 2004/0023108 A1* | 2/2004 | Nakanishi et al. | 429/178 |
| 2006/0003222 A1 | 1/2006 | Mushiga et al. | |
| 2006/0051664 A1* | 3/2006 | Tasai et al. | 429/161 |
| 2008/0131760 A1 | 6/2008 | Yamagami et al. | |
| 2008/0220316 A1 | 9/2008 | Berkowitz et al. | |
| 2009/0169989 A1 | 7/2009 | Morikawa et al. | |
| 2010/0021811 A1 | 1/2010 | Kado et al. | |
| 2010/0047686 A1 | 2/2010 | Tsuchiya et al. | |
| 2010/0081048 A1* | 4/2010 | Nansaka et al. | 429/158 |

(Continued)

FOREIGN PATENT DOCUMENTS

| | | |
|---|---|---|
| GB | 2 154 049 A | 8/1985 |
| JP | 59-58754 A | 4/1984 |

(Continued)

OTHER PUBLICATIONS

Extended European Search Report dated May 7, 2012.

(Continued)

*Primary Examiner* — Ula C Ruddock
*Assistant Examiner* — Lisa S Park Gehrke
(74) *Attorney, Agent, or Firm* — McGinn Intellectual Property Law Group, PLLC

(57) ABSTRACT

The present invention provides a battery that includes: an auxiliary terminal configured such that a first tube is connected to a metallic foil of an electrode of a power generating element through a current collecting connector by being fitted into a battery container through a terminal pull-out through hole of a lid plate, and sealed and fixed to the lid plate by insulating and sealing members; a connecting conductor configured such that one end portion is connected and fixed to an upper portion of the auxiliary terminal, and provided with a terminal through hole on the other end portion; an external terminal having a bolt portion that projects upward from a base portion and inserted through the terminal through hole of the connecting conductor from below; and a baffling member fixed onto the lid plate and restricting rotation of the external terminal by engaging with the base portion of the external terminal.

22 Claims, 5 Drawing Sheets

(56) References Cited

U.S. PATENT DOCUMENTS

| | | | |
|---|---|---|---|
| 2010/0092858 A1 | 4/2010 | Takashiro et al. | |
| 2010/0129709 A1 | 5/2010 | Matsubara | |
| 2010/0173178 A1 | 7/2010 | Kim et al. | |
| 2011/0300435 A1 | 12/2011 | Byun | |
| 2012/0264001 A1 | 10/2012 | Tsuchiya et al. | |
| 2012/0264003 A1 | 10/2012 | Tsuchiya et al. | |
| 2012/0264004 A1 | 10/2012 | Tsuchiya et al. | |
| 2012/0264005 A1 | 10/2012 | Tsuchiya et al. | |
| 2012/0264006 A1 | 10/2012 | Tsuchiya et al. | |

FOREIGN PATENT DOCUMENTS

| | | |
|---|---|---|
| JP | 2-54162 | 4/1990 |
| JP | 8-321287 A | 12/1996 |
| JP | 10-125291 A | 5/1998 |
| JP | 11-195561 A | 7/1999 |
| JP | 2000-138056(A) | 5/2000 |
| JP | 2001-126684 A | 5/2001 |
| JP | 2001-357833 A | 12/2001 |
| JP | 2001-357833 (A) | 12/2001 |
| JP | 2002-175797 A | 6/2002 |
| JP | 2002-324541 A | 11/2002 |
| JP | 2003-92103 A | 3/2003 |
| JP | 2003-323869 A | 11/2003 |
| JP | 2003-346774 A | 12/2003 |
| JP | 2003-346778 (A) | 12/2003 |
| JP | 2004-296447 A | 10/2004 |
| JP | 3612629 B2 | 1/2005 |
| JP | 2005-56649 A | 3/2005 |
| JP | 3708183 B2 | 10/2005 |
| JP | 2005-310569 A | 11/2005 |
| JP | 2006-19093 A | 1/2006 |
| JP | 2006-216411 A | 8/2006 |
| JP | 2007-107048 A | 4/2007 |
| JP | 3985805 B2 | 10/2007 |
| JP | 2008-27823 A | 2/2008 |
| JP | 2008-251213 (A) | 10/2008 |
| JP | 2009-52126 A | 3/2009 |
| JP | 2009-54531 A | 3/2009 |
| JP | 2009-224225(A) | 10/2009 |
| JP | 2009-259424 A | 11/2009 |
| JP | 2009-259739 A | 11/2009 |
| JP | 2009-277604 A | 11/2009 |
| JP | 2010-40533 A | 2/2010 |
| JP | 2010-97764 A | 4/2010 |
| JP | 2010-97822 A | 4/2010 |
| WO | WO 2008/016152 A1 | 2/2008 |
| WO | WO 2008/084883 (A2) | 7/2008 |
| WO | WO 2009/107657 A1 | 9/2009 |

OTHER PUBLICATIONS

Specification (pp. 1-31) and Drawings (Figs. 1-7) of related co-pending U.S. Appl. No. 13/336,947.
Specification (pp. 1-35) and Drawings (Figs. 1-7) of related co-pending U.S. Appl. No. 13/336,954.
Extended European Search Report dated Apr. 17, 2012.
Specification (pp. 1-37) and Drawings (Figs. 1-9) of related co-pending U.S. Appl. No. 13/354,193.
Specification (pp. 1-43) and Drawings (Figs. 1-8) of related co-pending U.S. Appl. No. 13/087,130.
US Office Action for co-pending related U.S. Appl. No. 13/087,130 dated Nov. 13, 2012.
US Office Action for co-pending related U.S. Appl. No. 13/087,130 dated Apr. 14, 2013.
U.S. Notice of Allowance dated Jul. 18, 2013, for U.S. Appl. No. 13/336,947.
Office Action dated Sep. 27, 2013 in U.S. Appl. No. 13/316,248.
United States Office Action dated Aug. 14, 2013, in U.S. Appl. No. 13/336,954.
Notice of Allowance dated Jul. 18, 2013 in U.S. Appl. No. 13/336,947.
Office Action dated Aug. 14, 2013 in U.S. Appl. No. 13/087,130.

\* cited by examiner

BATTERY INCLUDING BAFFLING MEMBER AND SEALING MATERIAL THAT SEALS AUXILIARY TERMINAL TO LID PLATE

BACKGROUND OF THE INVENTION

1. Field of the Invention

The present invention relates to a battery in which a terminal is provided for a lid plate covering a top opening of a battery container containing a power generating element.

2. Description of the Related Art

FIG. 6 shows an attachment structure of a terminal for a conventional large-sized nonaqueous electrolyte secondary battery (see FIG. 6 to FIG. 8 in JP-A-2001-357833, for example). This nonaqueous electrolyte secondary battery is configured such that an elliptic cylindrical winding power generating element 2 is contained within a battery container 1 and a top opening of the battery container 1 is covered and sealed by a lid plate 3. At both right and left ends of the power generating element 2, metallic foils 2a, 2a of electrodes respectively protrude in a wound state. These metallic foils 2a, 2a are connected to current collecting connectors 5, 5. Further, to both right and left ends of the lid plate 3, external terminals 4, 4 are attached.

The external terminal 4 is configured such that a bolt portion 4b is disposed projecting upward from an upper surface of a low and columnar base portion 4a, and a tube 4c is disposed projecting downward from a lower surface of the base portion 4a. Further, the tubes 4c, 4c of the external terminals 4, 4 respectively on a positive electrode side and a negative electrode side are fitted into the battery container 1 over the lid plate 3, respectively through through holes of external insulating and sealing members 6, 6 provided on an upper surface of the lid plate 3 at both right and left ends, terminal pull-out through holes 3a, 3a at the both right and left ends of the lid plate 3, and through holes of internal insulating and sealing members 7, 7 provided on a lower surface of the lid plate 3 at the both right and left ends. The tubes 4c, 4c are also swaged from below respectively through through holes provided in connecting portions 5a, 5a of the current collecting connectors 5, 5 that are bent in a horizontal direction. Therefore, each external terminal 4 is configured such that the tube 4c is connected to the current collecting connector 5 by the swaging, as well as to the metallic foil 2a of the electrode of the power generating element 2, and fixedly attached to the lid plate 3 in an insulated and sealed state as the lid plate 3 is held between the insulating and sealing members 6 and 7.

However, according to such an attachment structure of the external terminal 4, when a pressure-bonded terminal of a lead wire or the like is fitted into the bolt portion 4b of the external terminal 4 and fastened by a nut or the like in order to connect the nonaqueous electrolyte secondary battery to an external device, in particular when such a nut is repeatedly attached and detached, there is a possibility that fastening torque is directly applied to the portion of the tube 4c to make the caulking between the tube 4c and the connecting portion 5a of the current collecting connector 5 loose, and only the external terminal 4 possibly runs idle. The external terminal 4 running idle causes a problem of reduced battery performance due to an increased contact electrical resistance between the external terminal 4 and the current collecting connector 5, as well as a problem of defective sealing within the battery container 1 due to a gap occurring between the insulating and sealing members 6 and 7.

In addition, as aluminum alloy is often used for the external terminal 4 on the positive electrode side in the case of the nonaqueous electrolyte secondary battery, there is another problem that when the bolt portion 4b is tightly fastened by a nut or the like, or when such a nut is repeatedly attached and detached, a thread ridge of the bolt portion 4b is often damaged.

Accordingly, there have conventionally been proposed to provide the base portion 4a of the external terminal 4 in a polygonal columnar shape having a square or hexagonal transverse section, to provide an external terminal recessed portion of a corresponding shape for the external insulating and sealing member 6, and to have the base portion 4a be fitted into the external terminal recessed portion of the external insulating and sealing member 6, thereby baffling the external terminal 4 (see FIG. 1 to FIG. 5 of JP-A-2001-357833, for example).

However, even with such an attachment structure of the external terminal 4, there is a problem that the external terminal 4 possibly runs idle by a small amount of angle due to a small gap in the fitting between the base portion 4a and the external terminal recessed portion of the external insulating and sealing member 6, and it is not possible to completely prevent the caulking between the tube 4c and the connecting portion 5a of the current collecting connector 5 from becoming loose. In addition, there is another problem that when the bolt portion 4b is fastened by a nut or the like, the fastening torque is directly applied to the external insulating and sealing member 6 to apply a significant stress to the external insulating and sealing member 6, and whereby airtightness become impaired.

For this reason, conventionally, an attachment structure of the external terminal 4 as shown in FIG. 7 has also been proposed (see JP-A-2003-346774 (page 2 and FIG. 3), for example). According to the external terminal 4 of this example, the base portion 4a is provided in a hexagonal columnar shape, and the bolt portion 4b is disposed projecting from the upper surface of the base portion 4a, but a tube is not disposed projecting from the lower surface. Further, an external terminal recessed portion 6a of a similarly hexagonal shape is provided in an upper surface of the external insulating and sealing member 6, and the base portion 4a is fitted into the external terminal recessed portion 6a, thereby attempting to baffle the external terminal 4.

The upper surface of the external insulating and sealing member 6 is also provided with an auxiliary terminal recessed portion 6b, into which a base portion 8a of an auxiliary terminal 8 is fitted. The auxiliary terminal 8 is configured such that a first tube 8b is disposed projecting downward from a lower surface of the base portion 8a, and a second tube 8c is disposed projecting upward from an upper surface of the base portion 8a. Further, the first tubes 8b, 8b of the auxiliary terminals 8, 8 of the positive electrode side and the negative electrode side are fitted into the battery container 1 over the lid plate 3, respectively through through holes provided in bottom surfaces of the auxiliary terminal recessed portions 6b, 6b of the external insulating and sealing members 6, 6, the terminal pull-out through holes 3a, 3a at the both right and left ends of the lid plate 3, and the through holes of the internal insulating and sealing members 7, 7. The first tubes 8b, 8b are also swaged from below respectively through through holes provided in the connecting portions 5a, 5a of the current collecting connectors 5, 5. Therefore, each auxiliary terminal 8 is configured such that the first tube 8b is connected to the metallic foil 2a of the power generating element 2 through the connecting portion with the connecting portion 5a of the current collecting connector 5 by the swaging, and fixedly attached to the lid plate 3 in an insulated and sealed state as the lid plate 3 is held between the insulating and sealing members 6 and 7.

Further, a connecting conductor 9 is attached to the second tube 8c of the auxiliary terminal 8 and the bolt portion 4b of the external terminal 4. The connecting conductor 9 is a substantially rectangular plate member, in which a hole 9a is provided in one end, and a terminal through hole 9b is provided in the other end. Further, the connecting conductor 9 is configured such that the bolt portion 4b of the external terminal 4 is inserted into the terminal through hole 9b from below, and the second tube 8c of the auxiliary terminal 8 is inserted into the hole 9a from below, and swaged from above. Therefore, when the bolt portion 4b is fastened by a nut or the like in order to connect to the external device, the external terminal 4 is connected and fixed to the auxiliary terminal 8 through the connecting conductor 9, and thus connected to the metallic foil 2a of the electrode of the power generating element 2.

By using such an attachment structure of the external terminal 4, as the fastening torque is not directly applied to the auxiliary terminal 8 even when the bolt portion 4b is fastened by a nut or the like, the caulking between the auxiliary terminal 8 and the connecting portion 5a of the current collecting connector 5 may not become loose. In addition, even in the case of the nonaqueous electrolyte secondary battery, it is possible to use aluminum alloy only for the auxiliary terminal 8 on the positive electrode side, and iron, steel such as stainless, or another type of metallic materials having high strength can be used for the external terminal 4. Therefore, the thread ridge of the bolt portion 4b may not be damaged due to fastening by a nut or the like.

Conventionally, there is proposed a technique for baffling the external terminal by providing a projecting portion for the base portion of the external terminal, and inserting the projecting portion into a recessed hole of a lid plate made of resin (see JP-A-10-125291, for example). However, as baffling is carried out only based on the engagement between the projecting portion and the recessed hole when the fastening torque is applied to the external terminal, the external terminal possibly runs idle by a small amount of angle due to a small gap in the engagement, and it is not possible to sufficiently prevent the connection with the electrode of the power generating element from being impaired.

However, as a result of a great deal of consideration, there is a problem even in the attachment structure of the external terminal 4 as described above that as the fastening torque is directly applied to the external terminal recessed portion 6a of the external insulating and sealing member 6 when the bolt portion 4b is fastened by a nut or the like, a significant stress is applied by to the external insulating and sealing member 6 that seals between the auxiliary terminal 8 and the lid plate 3 by swaging the first tube 8b of the auxiliary terminal 8, and therefore it is not possible to prevent high level of airtightness from being impaired. Specifically, as the external insulating and sealing member 6 is pressed strongly by the upper surface of the lid plate 3, as well as subjected to a large strength in a twisted direction, slight deformation of the material generates a minor gap in an interface with the lid plate 3 and possibly makes the sealing defective. Further, as the external insulating and sealing member 6 is baffled with respect to the lid plate 3, the external insulating and sealing member 6 itself is possibly displaced slightly due to a slight gap between the baffling and the lid plate 3, and whereby a minor gap is generated in the interface with the lid plate 3 and possibly makes the sealing defective.

SUMMARY OF THE INVENTION

An object of the present invention is to provide a battery capable of baffling an external terminal using a baffling member provided separately from an external insulating and sealing member for sealing an auxiliary terminal, so that fastening torque of the external terminal would not impair airtightness and conductivity.

A first aspect of the present invention is a battery that includes: a battery container containing a power generating element; a lid plate covering a top opening of the battery container; an auxiliary terminal configured such that a lower portion thereof is connected to an electrode of the power generating element by being fitted into the battery container through a terminal pull-out through hole of the lid plate, and sealed and fixed to the lid plate through a sealing material; a connecting conductor configured such that a portion thereof is connected and fixed to an upper portion of the auxiliary terminal, and provided with a terminal connecting portion at a different portion; an external terminal having a base portion and a projecting portion that projects upward from the base portion, the projecting portion being connected to the terminal connecting portion of the connecting conductor; and a baffling member engaged with the base portion of the external terminal on the lid plate.

A second aspect of the present invention is such that, in place of the connecting conductor, the auxiliary terminal is provided with a connecting conductor portion that is pulled out from the upper portion of the auxiliary terminal, and the pulled-out portion is provided with the terminal connecting portion.

A third aspect of the present invention is such that the base portion of the external terminal is provided with a recessed portion facing upward in a bottom surface, a shape defined as the recessed portion being other than a solid of revolution centering an axial line of the projecting portion, and the baffling member is configured as a columnar body made of resin projecting upward with a bottom surface thereof being fixed onto the lid plate and having a transverse-sectional shape fitting into the recessed portion of the base portion, rotation of the external terminal centering the axial line of the projecting portion is restricted by fitting the columnar body of the transverse-sectional shape into the recessed portion of the base portion.

A fourth aspect of the present invention is such that the base portion of the external terminal is configured as a columnar body having a transverse-sectional shape other than a solid of revolution centering an axial line of the projecting portion, and the baffling member is configured as a member made of resin with a bottom surface thereof being fixed onto the lid plate and provided with a recessed portion facing downward in an upper surface, a shape defined as the recessed portion being a shape into which the base portion is fitted, rotation of the external terminal centering the axial line of the projecting portion is restricted by fitting the base portion into the recessed portion.

A fifth aspect of the present invention is such that, in place of the bolt portion, the external terminal is provided with a projecting portion projecting upward from the base portion and having a threaded hole facing downward in an upper end surface of the projecting portion.

A sixth aspect of the present invention is such that the battery is configured as a nonaqueous electrolyte secondary battery, the auxiliary terminal comprises at least one of aluminum and aluminum alloy on a positive electrode side, the auxiliary terminal comprises at least one of copper and copper alloy on a negative electrode side, and the external terminal comprise at least one of iron and steel.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Figure 5:
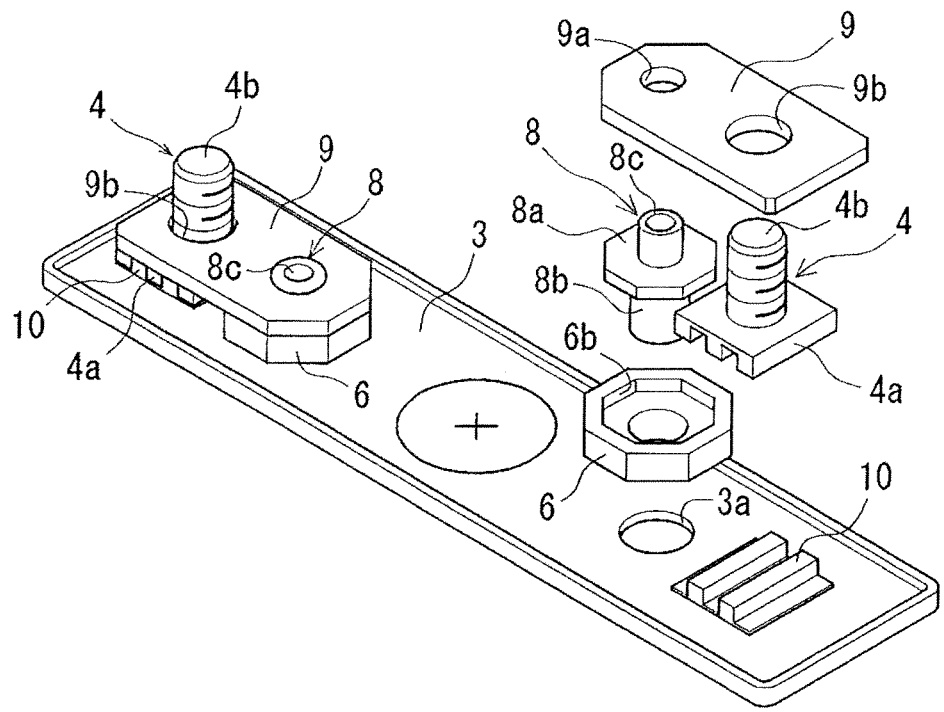
FIG. 5 shows a partially omitted exploded perspective view of a different embodiment of the present invention, in which a base portion and the baffling member of the external terminal are provided with concavity and convexity in a ridged manner.
Figure 6:
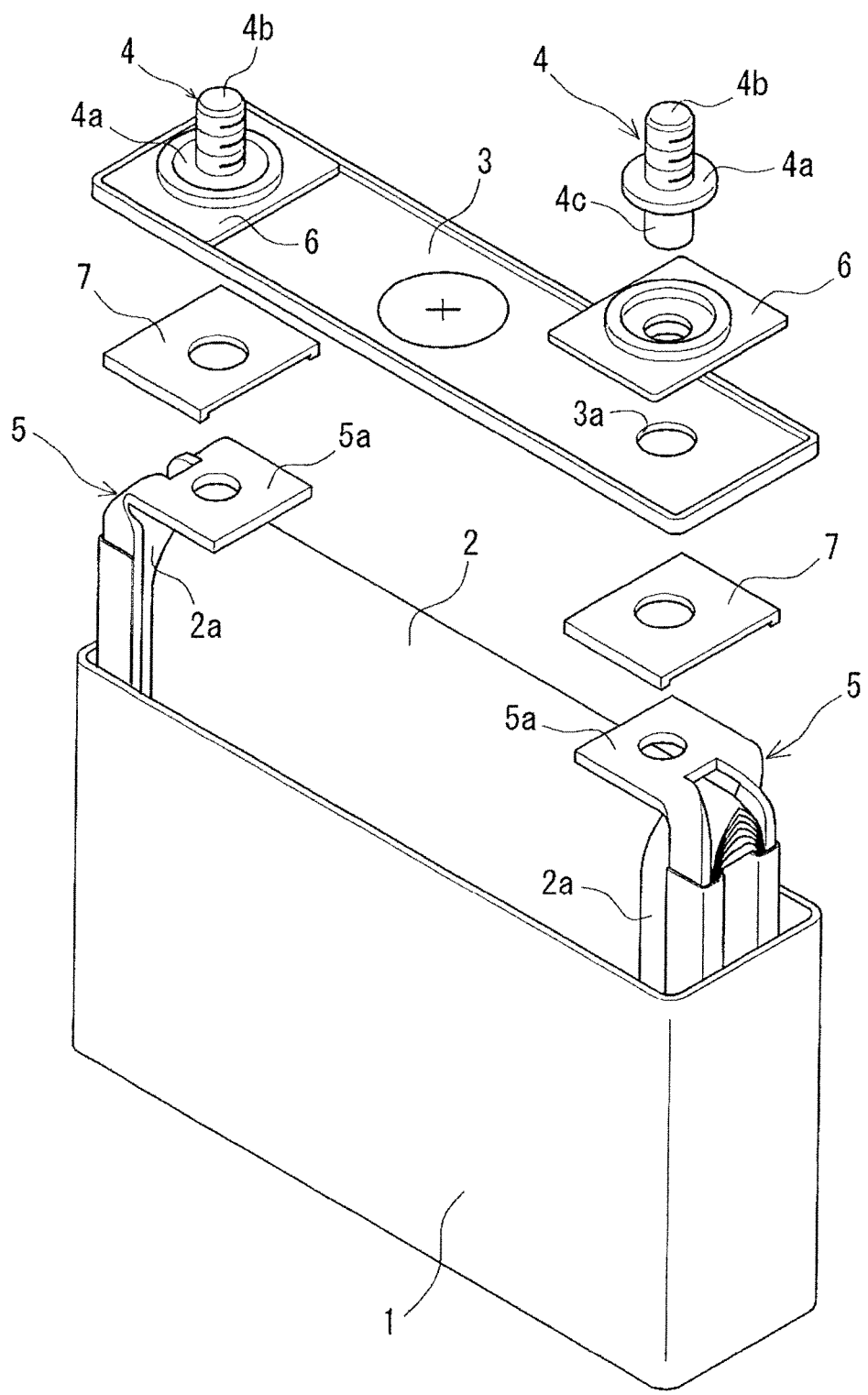
FIG. 6 shows an exploded perspective view of a conventional example, illustrating a structure of a nonaqueous electrolyte secondary battery.
Figure 7:
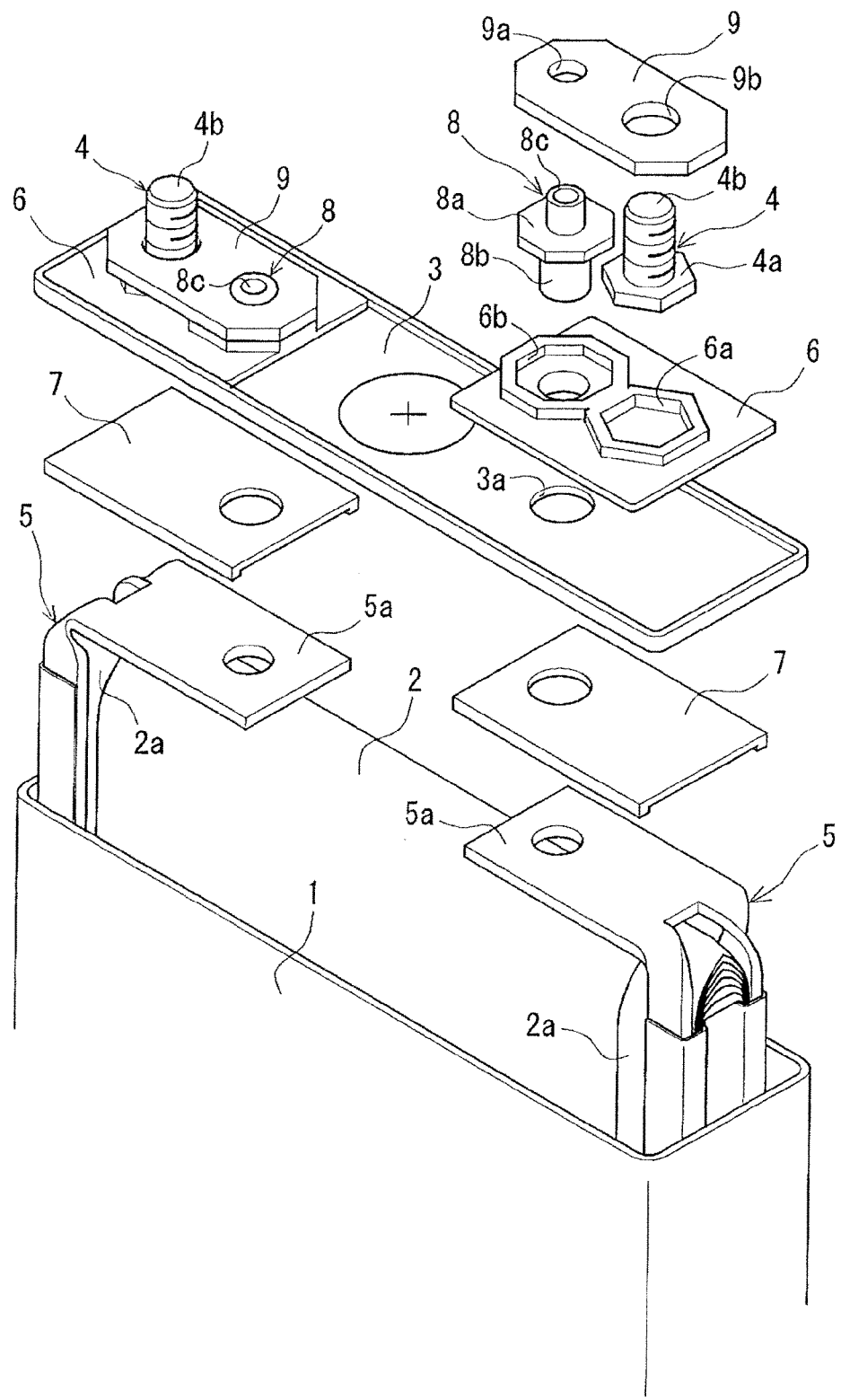
FIG. 7 shows an exploded perspective view of another conventional example, illustrating a structure of a nonaqueous electrolyte secondary battery.

Preferred embodiments of the present invention will be described hereinafter with reference to FIG. 1 to FIG. 5. Throughout the figures, like components having functions as those of the conventional examples illustrated in FIG. 6 and FIG. 7 are denoted by like reference numerals.

Figure 1:
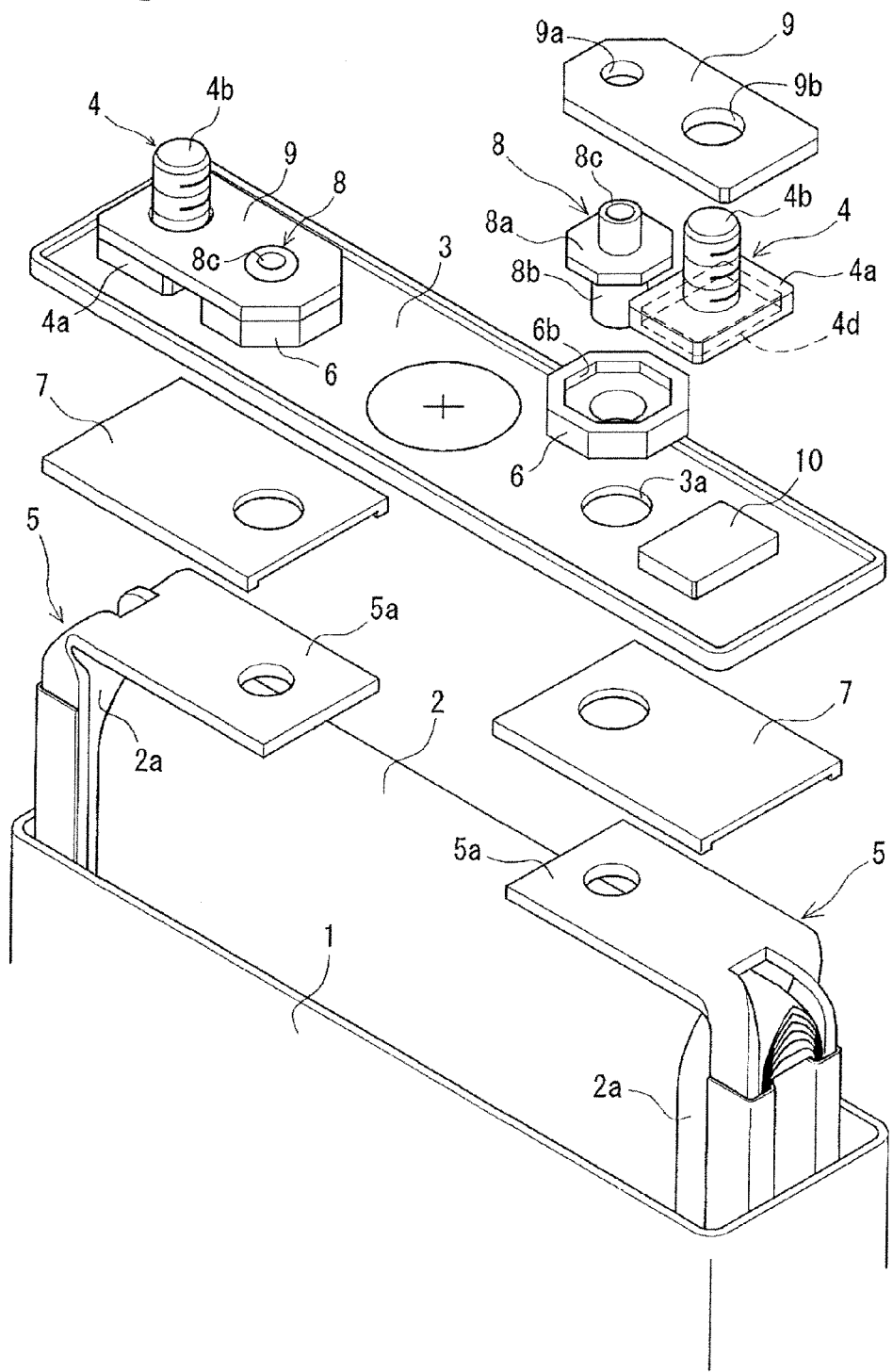
FIG. 1 shows an exploded perspective view of one embodiment of the present invention, illustrating a structure of a nonaqueous electrolyte secondary battery.
Figure 2:
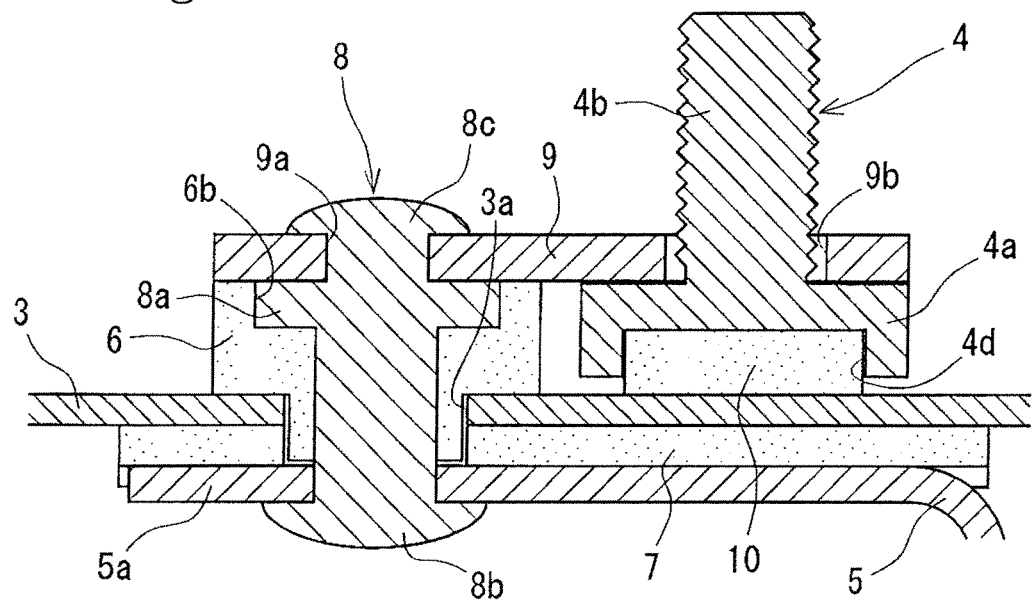
FIG. 2 shows a partially enlarged cross-sectional elevational view of one embodiment of the present invention, illustrating an attachment structure of an external terminal of the nonaqueous electrolyte secondary battery.

This embodiment describes a large-sized nonaqueous electrolyte secondary battery. Referring to FIG. 1 and FIG. 2, the nonaqueous electrolyte secondary battery is configured such that a battery container 1 contains an elliptic cylindrical winding power generating element 2, and sealed by a lid plate 3 covering a top opening of the battery container 1.

The power generating element 2 is configured such that a positive electrode and a negative electrode as belt-shaped electrodes are displaced in different directions of right and left with a separator interposed therebetween and wound centering a rotation axis along a right and left direction in an elliptic cylindrical shape so as to form an ellipse along an up and down direction. The positive electrode is configured such that a positive active material is supported on a surface of an aluminum foil, and the negative electrode is configured such that a negative active material is supported on a surface of a copper foil. The aluminum foil and the copper foil are exposed by making end edge portions thereof respectively in the directions displacing to right and left as portions uncoated by the corresponding active materials. Therefore, from right and left end portions of the power generating element 2, metallic foils 2a, 2a of the electrodes protrude in a wound state.

The metallic foils 2a, 2a that protrude from the right and left end portions of the power generating element 2 are respectively connected to current collecting connectors 5, 5. Each current collecting connector 5 is a vertically elongated conductive metal plate made of aluminum or aluminum alloy on a positive electrode side and made of copper or copper alloy on a negative electrode side. In each current collecting connector 5, an upper portion forms a connecting portion 5a that is bent horizontally and provided with a through hole, and a portion under the connecting portion 5a is divided into two in a back and forth direction and extends downward. Further, the portion under the current collecting connector 5 that is divided into two is sandwiched by a holding plate along with the metallic foil 2a of the power generating element 2, and connected and fixed by ultrasonic welding and the like.

The battery container 1 and the lid plate 3 are made of aluminum alloy, steel, or the like. The battery container 1 is a rectangular metallic container elongated in the right and left direction, and the lid plate 3 is a rectangular metal plate that is narrow and elongated in the right and left direction. Further, the lid plate 3 is later fitted into the top opening of the battery container 1 and seals an interior by laser welding and the like.

The lid plate 3 is provided, in its right and left end portions, with terminal pull-out through holes 3a, 3a (the terminal pull-out through hole 3a on the left side is hidden behind the components and not shown), to which auxiliary terminals 8, 8 are attached through external insulating and sealing members 6, 6 and internal insulating and sealing members 7, 7. Each auxiliary terminal 8 is a conductive metallic component made of aluminum or aluminum alloy on the positive electrode side and made of copper or copper alloy on the negative electrode side. In each auxiliary terminal 8, a first tube 8b is disposed projecting downward from a lower surface of a base portion 8a in a low and octagonal columnar shape, and a second tube 8c is disposed projecting upward from an upper surface of the base portion 8a.

The external insulating and sealing member 6 and the internal insulating and sealing member 7 are made of synthetic resin having insulating properties and sealing properties. The external insulating and sealing member 6 is provided as an octagonal columnar body that is slightly larger than the base portion 8a of the auxiliary terminal 8, and is provided, on its upper surface, with an auxiliary terminal recessed portion 6b into which the base portion 8a is fitted. Further, the external insulating and sealing member 6 is provided with a through hole in a bottom surface of the auxiliary terminal recessed portion 6b, and an opening in a lower surface of the through hole projects downward in a sleeved manner (see FIG. 2). The internal insulating and sealing member 7 is a plate member provided with a through hole. As a sealing member 6, a square columnar can be used.

The external insulating and sealing member 6 is disposed on the upper surface of the lid plate 3, and its portion projecting in a sleeved manner is fitted into the terminal pull-out through hole 3a. Further, the internal insulating and sealing member 7 is disposed on the lower surface of the lid plate 3, and the portion of the external insulating and sealing member 6 projecting in a sleeved manner downward from the terminal pull-out through hole 3a is fitted into the through hole. Then, the auxiliary terminal 8 is attached to the lid plate 3 by fitting the base portion 8a into the auxiliary terminal recessed portion 6b of the external insulating and sealing member 6, by inserting the first tube 8b into the through hole of the connecting portion 5a of the current collecting connector 5 through the through hole in the bottom surface of the auxiliary terminal recessed portion 6b, the terminal pull-out through hole 3a of the lid plate 3, and the through hole of the internal insulating and sealing member 7, and by swaging a portion that extends downward from the through hole of the connecting portion 5a from below. Therefore, the auxiliary terminal 8 is fixed to the lid plate 3 in an insulated and sealed state, as the auxiliary terminal 8 is connected to the metallic foil 2a of the power generating element 2 through the connecting portion between the first tube 8b and the connecting portion 5a of the current collecting connector 5, and sandwiches and holds the lid plate 3 with the insulating and sealing members 6 and 7.

To the lid plate 3, baffling members 10, 10 are fixed at outward sides of the terminal pull-out through holes 3a, 3a in the right and left of the upper surface (the baffling member 10 on the left side is hidden behind the components and not shown). The baffling member 10 is a low square columnar block made of synthetic resin such as polyphenylene sulfide (PPS). The baffling member 10 is molded by processing such that a metallic surface of a portion of the upper surface of the lid plate 3 to which the baffling member 10 is to be fixed has a fine concavity and convexity, disposing a mold so as to enclose a portion above the processed portion, and casting and solidifying molten resin in the mold. Here, although the baffling member 10 can be molded in a block shape and fixed to the upper surface of the lid plate 3 by adhesive or thermal adhesion, the baffling member 10 that is directly injection-molded after the surface treatment to the surface of the lid plate 3 can be more strongly fixed.

Above the baffling member 10, an external terminal 4 is disposed. The external terminal 4 is for connecting the nonaqueous electrolyte secondary battery with an external device, and made of iron, steel such as stainless steel or chromium molybdenum steel, or another type of high strength conductive metallic materials. The external terminal 4 is configured such that a bolt portion 4b is disposed projecting upward from an upper surface of a base portion 4a that is a low square column and slightly larger than the baffling member 10. Further, a lower surface of the base portion 4a is provided with a baffling recessed portion 4d into which the baffling member 10 is fitted facing upward. Then, the external terminal 4 is placed on the baffling member 10 such that the baffling recessed portion 4d of the base portion 4a covers the baffling member 10. However, as the depth of the baffling recessed portion 4d in the base portion 4a of the external terminal 4 is slightly smaller than the height of the baffling member 10, the lower surface of the base portion 4a is lifted from the upper surface of the lid plate 3.

To the second tube 8c of the auxiliary terminal 8 and the bolt portion 4b of the external terminal 4, a connecting conductor 9 is attached. The connecting conductor 9 is a substantially rectangular plate member made of a conductive metallic material such as copper alloy, and its surface is nickel plated in order to make the surface smooth in addition to a purpose of corrosion prevention. One end portion of the connecting conductor 9 is provided with a hole 9a, and the other end portion of the connecting conductor 9 is provided with a terminal through hole 9b. Further, the connecting conductor 9 is swaged from above, by inserting the bolt portion 4b of the external terminal 4 into the terminal through hole 9b from below, and inserting the second tube 8c of the auxiliary terminal 8 into the hole 9a from below. Therefore, while the connecting conductor 9 is connected and fixed to the auxiliary terminal 8, the external terminal 4 only has the bolt portion 4b be fitted into the terminal through hole 9b. Here, in order to reliably fix the flat connecting conductor 9 to the auxiliary terminal 8 by securing, it is preferable that the upper surface of the base portion 8a of the auxiliary terminal 8 be flush with or slightly higher than the upper surface of the base portion 4a of the external terminal 4 placed on the baffling member 10.

However, the upper surface of the base portion 4a should not be too low, as it is not possible for the baffling member 10 to baffle the external terminal 4 if the fitting between the baffling recessed portion 4d and the baffling member 10 is disengaged when the external terminal 4 is lifted and the upper surface of the base portion 4a is brought into contact with the lower surface of the connecting conductor 9.

According to the external terminal 4 of the nonaqueous electrolyte secondary battery having the above structure, for example, a pressure-bonded terminal of a lead wire of the external device, which is not illustrated, is fitted into the bolt portion 4b and screwed by a nut. Then, the external terminal 4 is usually slightly lifted to press the upper surface of the base portion 4a against the lower surface of the connecting conductor 9, and sandwiches and presses the connecting conductor 9 along with the pressure-bonded terminal of the lead wire between the external terminal 4 and the nut, thereby connecting the pressure-bonded terminal, the external terminal 4, and the connecting conductor 9. Therefore, the pressure-bonded terminal of the lead wire is connected to the electrode of the power generating element 2 (the metallic foil 2a) through the connecting conductor 9, the auxiliary terminal 8, and the current collecting connector 5, and whereby the external device is connected to the nonaqueous electrolyte secondary battery.

In addition, the external terminal 4 that tends to rotate when fastening the nut to the bolt portion 4b is reliably baffled by the baffling member 10 that is fitted into the baffling recessed portion 4d. At this time, even if the external terminal 4 runs idle by an angle to some extent due to a small gap in the fitting between the baffling member 10 and the baffling recessed portion 4d, this may not result in any problem in the connection and the sealing.

Further, fastening torque applied to the bolt portion 4b at this time is not transmitted as torque to the auxiliary terminal 8 provided separately from the external terminal 4. Accordingly, there is no possibility that the auxiliary terminal 8 runs idle to make the caulking with the connecting portion 5a of the current collecting connector 5 loose to impair the connection, or that the sealing between the insulating and sealing members 6 and 7 and the lid plate 3 is impaired. Here, the fastening torque by the nut also generates a force so as to rotate the connecting conductor 9 centering an axial line of the bolt portion 4b. However, such a force presses the second tube 8c of the auxiliary terminal 8 in the back and forth direction, and may not impair the connection or the sealing. In particular, according to this embodiment, as the connecting conductor 9 is nickel plated to make its surface smooth, the fastening by the nut hardly generates a force that can rotate the connecting conductor 9.

Further, the baffling member 10 baffles the external terminal 4 when fastened by the nut, thus receives large fastening torque. However, as the baffling member 10 is separated from the external insulating and sealing member 6 on the lid plate 3, the fastening torque is not applied to the external insulating and sealing member 6 that seals the auxiliary terminal 8. Accordingly, there is no possibility that the sealing by the external insulating and sealing member 6 is impaired.

Moreover, the fastening torque by the nut is applied only to the external terminal 4 made of a high strength conductive metallic material such as iron or steel, and not to the auxiliary terminal 8 on the positive electrode side made of aluminum or aluminum alloy having poor strength nor to the auxiliary terminal 8 on the negative electrode side made of copper or copper alloy having relatively poor strength. Accordingly, even if the nut is strongly fastened or repeatedly attached and detached, there is no possibility that the thread ridge of the bolt portion 4b is damaged.

Here, the above embodiment describes the example in which the external terminal 4 is baffled by fitting the baffling member 10 having a square columnar shape into the baffling recessed portion 4d of the base portion 4a. However, the base portion 4a and the baffling member 10 may take any shape as long as the rotation of the external terminal 4 centering the axial line of the bolt portion 4b can be restricted by the engagement between the base portion 4a and the baffling member 10.

Figure 3:
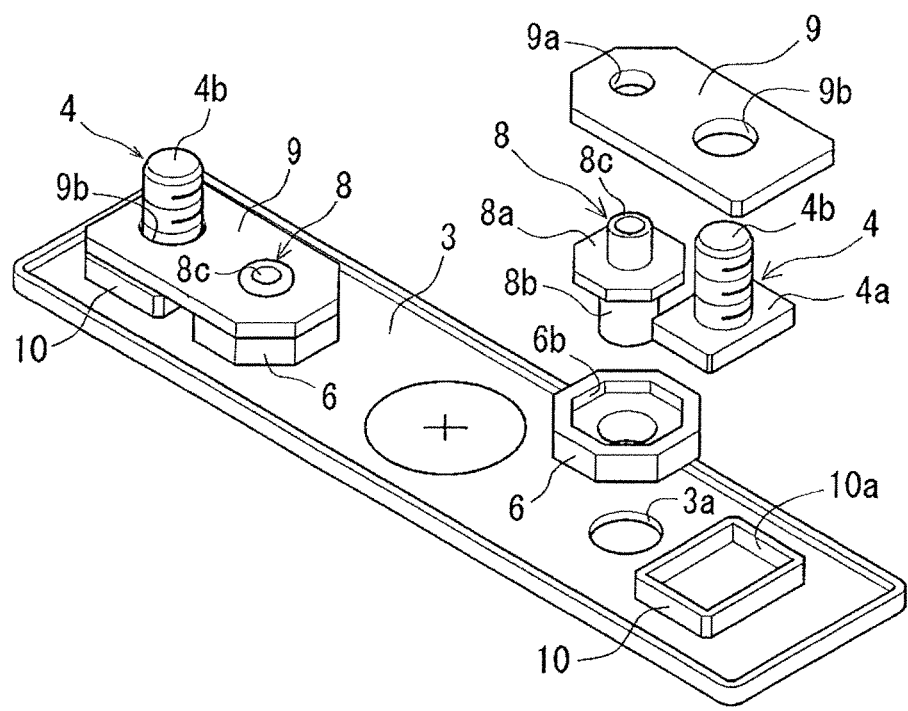
FIG. 3 shows a partially omitted exploded perspective view of a different embodiment of the present invention, illustrating a case in which a baffling member is provided with a baffling recessed portion.

FIG. 3 shows an example in which the base portion 4a of the external terminal 4 is in a square columnar shape, and the baffling member 10 is in a square columnar shape slightly larger than the base portion 4a, and provided with, in its upper surface, a baffling recessed portion 10a having a shape into which the base portion 4a is fitted. In this case, also, the external terminal 4 can be baffled by fitting the base portion 4a into the baffling recessed portion 10a of the baffling member 10. In a case in which the baffling member 10 and the base portion 4a are baffled by fitting a columnar body into a recessed portion as shown in FIG. 1 and FIG. 3, the columnar body and the recessed portion may take any transverse-sectional shape as long as it is not a solid of revolution centering the axial line of the bolt portion 4b, and any polygonal columnar shape other than a square columnar shape can be used.

Figure 4:
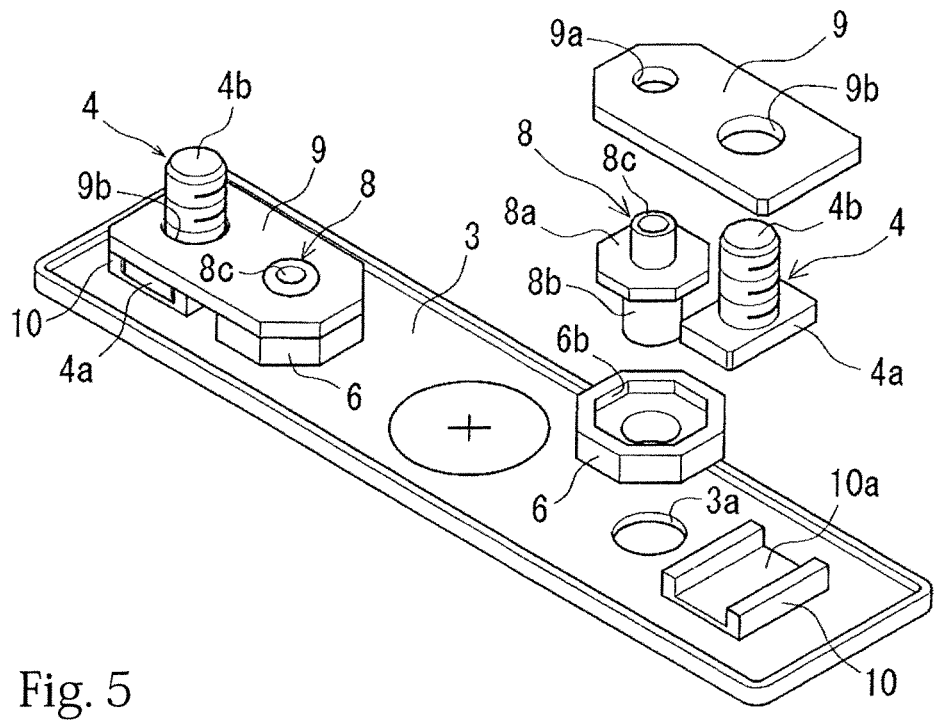
FIG. 4 shows a partially omitted exploded perspective view of a different embodiment of the present invention, illustrating a case in which the baffling recessed portion of the baffling member is provided as a groove.

Further, FIG. 4 shows an example in which the baffling recessed portion 10a of the baffling member 10 illustrated in FIG. 3 is not a recessed portion defined in a square shape, but a recessed portion provided as a groove. In this case, also, restricting the rotation of the external terminal 4 by an edge portion of the groove by fitting the base portion 4a into the baffling recessed portion 10a provided as a groove can baffle the external terminal 4. In addition, FIG. 5 shows an example in which concavity and convexity in a ridged manner are provided on the lower surface of the base portion 4a and the upper surface of the baffling member 10, and the external terminal 4 is baffled by the concavity and the convexity meshing with each other.

Moreover, the above embodiment describes the example in which the baffling member 10 made of synthetic resin is used. However, it is possible to use any material such as ceramics, as long as the material is provided with insulating properties and strength of a certain degree or more. In addition, when it is not necessary to consider the insulation of the external terminal 4 such as in a case in which the lid plate 3 may be conductive to the external terminal 4 or in which the lid plate 3 is made of a material having insulating properties, any material having no insulating property such as metal can be used as long as the material is provided with strength of a certain degree or more. Further, the baffling member 10 can be fixed onto the lid plate 3 by any method that is appropriate for the material of the baffling member 10, such as welding if the fixation is carried out between the metallic materials. Moreover, the baffling member 10 is not limited to fixed onto the lid plate 3, and may be provided on the lid plate 3 integrally with the lid plate 3, and the baffling member 10 may be provided by processing a part of the lid plate 3, for example.

Furthermore, while the above embodiment describes that the current collecting connector 5 and the auxiliary terminal 8 are made of aluminum or aluminum alloy on the positive electrode side, and made of copper or copper alloy on the negative electrode side, any material may be used as long as the material is a conductive metallic material that is appropriate for the type of the battery. In addition, while the above embodiment also shows the examples of the material of the external terminal 4 and the connecting conductor 9, any material may be used as long as the material is a conductive metallic material having suitable properties of strength and conductivity.

Further, the above embodiment describes the example in which the bolt portion 4b is disposed projecting from the upper surface of the base portion 4a of the external terminal 4. However, it is also practicable to provide a projecting portion having an appropriate shape such as a cylindrical or polygonal tubular shape projecting upward, in place of the bolt portion 4b, and to define a threaded hole in an upper end surface of the projecting portion.

Moreover, the above embodiment describes the example in which the second tube 8c of the auxiliary terminal 8 is connected and fixed by swaging through the hole 9a of the connecting conductor 9. However, any method for connecting and fixing the auxiliary terminal 8 to the connecting conductor 9 may be used, and it is possible to connect and fix the one end portion of the connecting conductor 9 to the upper surface of the base portion 8a of the auxiliary terminal 8 by welding and the like.

Furthermore, the component provided in the other end portion of the connecting conductor 9 is not limited to the terminal through hole 9b through which the bolt portion of the external terminal 4 is inserted from below and connected, and may be any terminal connecting portion to which the bolt portion 4b is connected, for example, such as a cut-out groove. In addition, the connecting conductor 9 is not required to be in a plated shape, as long as the terminal connecting portion is provided at the other end portion. Further, the portion at which the connecting conductor 9 is connected and fixed to the auxiliary terminal 8 is not limited to the one end portion, and may be any portion as long as it is a part of the connecting conductor 9, and the terminal connecting portion may be provided at any portion as long as it is a portion other than the portion to be connected and fixed to the auxiliary terminal 8.

Further, the above embodiment describes the example in which the connecting conductor 9 is used. However, a connecting conductor portion that is pulled out from the upper portion of the auxiliary terminal 8 and configured such that the terminal connecting portion is provided at the pulled-out portion may be used in place of the connecting conductor 9. In this case, as the connecting conductor portion is integral with the auxiliary terminal 8, the connecting conductor 9 is not necessary and a number of the components can be reduced, and the fixing with the connecting conductor 9 is not necessary and the number of assembly steps can also be reduced.

Moreover, the above embodiment describes the example in which the auxiliary terminal 8 and the electrode of the power generating element 2 are connected through the current collecting connector 5. However, any connection structure between the auxiliary terminal 8 and the electrode may be employed, and a current collecting connector different from that used in the above embodiment may be used, or other method may be employed for the connection. In addition, the power generating element 2 is not limited to the elliptic cylindrical winding structure, and may have a different shape, such as a stacked type.

Furthermore, the above embodiment describes the example in which the base portion 8a of the auxiliary terminal 8 and the external insulating and sealing member 6 are in an octagonal columnar shape. However, the base portion 8a and the external insulating and sealing member 6 may take any shape, and the external insulating and sealing member 6 is not necessarily required to be provided with the auxiliary terminal recessed portion 6b. In addition, the above embodiment describes the example in which the auxiliary terminal 8 is configured such that the first tube 8b is disposed projecting from the lower surface of the base portion 8a. However, the base portion 8a and the first tube 8b are not necessarily required as long as the upper portion is disposed on the lid plate 3 and the lower portion is fitted into the battery container 1 through the terminal pull-out through hole 3a. In particular, the first tube 8b can be modified to have any structure according to the connection structure between the auxiliary terminal 8 and the electrode.

Further, the above embodiment describes the example in which the external insulating and sealing member 6 and the internal insulating and sealing member 7 are used as the sealing material. However, any sealing material may be used as long as it seals between the auxiliary terminal 8 and the lid plate 3. For example, as the fastening torque is not applied to the auxiliary terminal 8, the auxiliary terminal 8 may be sealed and fixed to the lid plate 3 by a hermetic seal, or a sheet-type or adhesive-type sealing material can also be used.

Moreover, the above embodiment describes the example in which the battery container 1 and the lid plate 3 are made of aluminum alloy, steel, or the like. However, any material may be used for the battery container 1 and the lid plate 3, and it is possible to use a material other than metal, for example, a material having insulating properties. In addition, the shape and the structure of the battery container 1 and the lid plate 3 are not limited to the above embodiment, and may have any shape and structure.

Furthermore, the above embodiment describes the large-sized nonaqueous electrolyte secondary battery. However, the battery may be of any type and any size (capacity). Among a variety of batteries, the present invention can be suitably applied in particular to a sealed battery requiring high air-tightness.

According to a first aspect of the invention, the external terminal connected to the external device and the auxiliary terminal connected to the electrode of the power generating element within the battery container are indirectly connected via the connecting conductor, and are provided as separate components. Therefore, there is no possibility that the fastening torque applied to the projecting portion of the external terminal is applied to the auxiliary terminal, that the sealing of the sealing material between the auxiliary terminal and the lid plate is impaired, or that the connection between the auxiliary terminal and the electrode of the power generating element is impaired. Further, the sealing material between the auxiliary terminal and the lid plate and the baffling member for baffling the external terminal are provided as separate components. Therefore, the baffling member restricts the idle running of the external terminal, and there is no possibility that the fastening torque applied to the projecting portion of the external terminal impairs the sealing between the auxiliary terminal and the lid plate.

In this case, it is preferable that the terminal connecting portion of the connecting conductor is configured as a terminal through hole into which the projecting portion of the external terminal can be inserted from below. Further, it is preferable that the baffling member is fixed onto the lid plate.

According to a second aspect of the invention, it is possible to reduce the number of assembly steps and components for connecting and fixing the portion of the connecting conductor to the auxiliary terminal by swaging and the like.

According to a third aspect of the invention, the baffling member having a transverse-sectional shape other than a solid of revolution is fitted into the recessed portion of the base portion of the external terminal. Therefore, the baffling of the external terminal can be ensured.

According to a fourth aspect of the invention, the base portion of the external terminal having a transverse-sectional shape other than a solid of revolution is fitted into the recessed portion of the baffling member. Therefore, the baffling of the external terminal can be ensured.

According to a fifth aspect of the invention, the same effect can be obtained when using the external terminal having the threaded hole in place of the projecting portion.

According to a sixth aspect of the invention, the fastening by a nut or the like for the connection to the external device is realized by the external terminal made of iron or the like having high strength. Therefore, it is possible to prevent the projecting portion of the external terminal and the thread ridge of the threaded hole from being damaged.

What is claimed is:

1. A battery, comprising:
   a battery container containing a power generating element;
   a lid plate covering a top opening of the battery container;
   an auxiliary terminal comprising a lower portion thereof connected to an electrode of the power generating element by being fitted into the battery container through a through hole of the lid plate, and sealed and fixed to the lid plate through a sealing material;
   a connecting conductor comprising a first portion thereof connected and fixed to an upper portion of the auxiliary terminal, and comprising a terminal connecting portion at a second portion;
   an external terminal comprising a base portion and a projecting portion that projects upward from the base portion, the projecting portion being connected to the terminal connecting portion of the connecting conductor; and
   a baffling member engaged with the base portion of the external terminal and fixed on the lid plate,
   wherein the baffling member is separated from the sealing material such that a gap exists between the baffling member and the sealing material such that the baffling member is not in direct contact with the sealing material, and
   wherein both of the baffling member and the sealing material are located on opposing ends of the lid plate.

2. The battery according to claim 1, wherein the base portion of the external terminal is provided with a recessed portion extending upward from a bottom surface thereof,
   wherein the baffling member comprises a columnar body projecting upward with a bottom surface thereof being fixed onto the lid plate and having a shape fitting into the recessed portion of the base portion of the external terminal, and
   wherein the columnar body is fitted into the recessed portion of the base portion.

3. The battery according to claim 1, wherein the base portion of the external terminal comprises a columnar body,
   wherein the baffling member comprises a member that includes a bottom surface being fixed onto the lid plate and a recessed portion extending downward from an upper surface thereof, and
   wherein the base portion of the external terminal is fitted into the recessed portion of the baffling member.

4. The battery according to claim 1, wherein the projecting portion comprises a bolt portion that projects upward from the base portion thereof.

5. The battery according to claim 3, wherein the projecting portion comprises a bolt portion that projects upward from the base portion thereof.

6. The battery according to claim 1, wherein the projecting portion comprises a threaded hole facing downward in an upper end surface of the projecting portion.

7. The battery according to claim 1, wherein the battery comprises a nonaqueous electrolyte secondary battery,
wherein the auxiliary terminal on a positive electrode side comprises at least one of aluminum and an aluminum alloy,
wherein the auxiliary terminal on a negative electrode side comprises at least one of copper and a copper alloy, and
wherein the external terminal comprises at least one of iron and steel.

8. The battery according to claim 1, wherein the baffling member comprises a resin.

9. The battery according to claim 1, wherein the auxiliary terminal comprises a base portion between the upper portion and the lower portion thereof,
wherein the sealing material comprises a columnar body, and includes a bottom surface on the lid plate and a recessed portion extending downward from an upper surface thereof, and
wherein the base portion of the auxiliary terminal is fitted into the recessed portion of the sealing material.

10. The battery according to claim 2, wherein the auxiliary terminal comprises a base portion between the upper portion and the lower portion thereof,
wherein the sealing material comprises a columnar body, and includes a bottom surface on the lid plate and a recessed portion extending downward from an upper surface thereof, and
wherein the base portion of the auxiliary terminal is fitted into the recessed portion of the sealing material.

11. The battery according to claim 3, wherein the auxiliary terminal comprises a base portion between the upper portion and the lower portion thereof,
wherein the sealing material comprises a columnar body, and includes a bottom surface on the lid plate and a recessed portion extending downward from an upper surface thereof, and
wherein the base portion of the auxiliary terminal is fitted into the recessed portion of the sealing material.

12. A battery, comprising:
a battery container containing a power generating element;
a lid plate covering a top opening of the battery container;
an auxiliary terminal sealed and fixed to the lid plate through a sealing material and comprising a terminal connection portion and a lower portion connected to an electrode of the power generating element by being fitted into the battery container through a through hole of the lid plate;
an external terminal comprising a base portion and a projecting portion that projects upward from the base portion, the projecting portion being connected to the terminal connecting portion of the auxiliary terminal; and
a baffling member engaged with the base portion of the external terminal on the lid plate,
wherein the baffling member is separated from the sealing material such that a gap exists between the baffling member and the sealing material such that the baffling member is not in direct contact with the sealing material, and
wherein both of the baffling member and the sealing material are located on opposing ends of the lid plate.

13. The battery according to claim 12, wherein the base portion of the external terminal is provided with a recessed portion extending upward from a bottom surface thereof,
wherein the baffling member comprises a columnar body projecting upward with a bottom surface thereof being fixed onto the lid plate and having a shape fitting into the recessed portion of the base portion of the external terminal, and
wherein the columnar body is fitted into the recessed portion of the base portion.

14. The battery according to claim 12, wherein the base portion of the external terminal comprises a columnar body,
wherein the baffling member comprises a member having a bottom surface being fixed onto the lid plate and a recessed portion extending downward from an upper surface thereof, and
wherein the base portion of the external terminal is fitted into the recessed portion of the baffling member.

15. The battery according to claim 12, wherein the auxiliary terminal comprises a base portion between the upper portion and the lower portion thereof,
wherein the sealing material comprises a columnar body, and includes a bottom surface on the lid plate and a recessed portion extending downward from an upper surface thereof, and
wherein the base portion of the auxiliary terminal is fitted into the recessed portion of the sealing material.

16. The battery according to claim 2, wherein the columnar body comprises a polygonal columnar body.

17. The battery according to claim 3, wherein the columnar body comprises a polygonal columnar body.

18. A battery, comprising:
a battery container which contains a power generating element therein and whose top surface is opened;
an electrode plate connected to the power generating element;
a first insulating member provided on the electrode plate;
a lid provided on the first insulating member to cover the top surface of the battery container, the lid comprising a first through hole therethrough;
a second insulating member provided on the lid;
an auxiliary terminal fixed to the lid through the second insulating member, the auxiliary terminal comprising an upper portion and a lower portion, wherein the lower portion of the auxiliary terminal is connected to the electrode plate through the first through hole of the lid;
a connecting conductor comprising a second through hole and a third through hole, wherein the upper portion of the auxiliary terminal is fixed to the connecting conductor through the second through hole;
an external terminal comprising a base portion and a projecting portion projecting from the base portion, wherein the projecting portion is connected to the connecting conductor through the third through hole; and
a baffle provided on the lid and engaged with the base portion of the external terminal,
wherein the baffle is separated from the second insulating member such that a gap exists between the baffle and the sealing material such that the baffle is not in direct contact with the sealing material, and
wherein both of the baffle and the second insulating member are located on opposing ends of the lid.

19. The battery according to claim 1, wherein the baffling member comprises polyphenylene sulfide.

20. The battery according to claim 1, wherein the baffling member comprises a first baffling member and a second baffling member,
wherein the sealing material comprises a first sealing material and a second sealing material, and wherein, with respect to a middle portion of the lid plate, the first baffling material and the first sealing material are located in one of the sides of the lid plate and the second baffling material and the second sealing material are located in another one of the sides of the lid plate.

21. The battery according to claim 1, wherein the baffling member comprises a first baffling member and a second baffling member,
   wherein the sealing material comprises a first sealing material and a second sealing material, and
   wherein the first baffling member and the first sealing material are located in a positive electrode side of the lid plate and the second baffling member and the second sealing material are located in a negative electrode side of the lid plate.

22. A battery, comprising:
   a power generating element comprising a first electrode and a second electrode;
   a battery container containing the power generating element;
   a lid plate covering a top opening of the battery container;
   a first auxiliary terminal comprising a lower portion thereof electrically connected to the first electrode by being fitted into the battery container through a first through hole of the lid plate, and sealed and fixed to the lid plate through a first sealing material;
   a second auxiliary terminal comprising a lower portion thereof electrically connected to the second electrode by being fitted into the battery container through a second through hole of the lid plate, and sealed and fixed to the lid plate through a second sealing material;
   a first connecting conductor being electrically connected to the first auxiliary terminal;
   a second connecting conductor being electrically connected to the second auxiliary terminal;
   a first external terminal comprising a base portion and a projecting portion that projects upward from the base portion, and being electrically connected to the first connecting conductor;
   a second external terminal comprising a base portion and a projecting portion that projects upward from the base portion, and being connected to the second connecting conductor; and
   a baffling member engaged with the base portion of the first external terminal and fixed on the lid plate,
   wherein the baffling member is separated from the first sealing material and the second sealing material such that a gap exists between the baffling member and the first sealing material and such that the baffling member is not in direct contact with the first sealing material, and another gap exists between the baffling member and the second sealing material such that the baffling member is not in direct contact with the second sealing material.

* * * * *